UNITED STATES PATENT OFFICE.

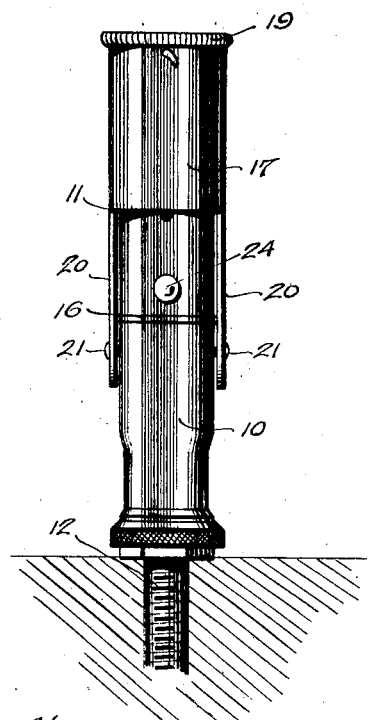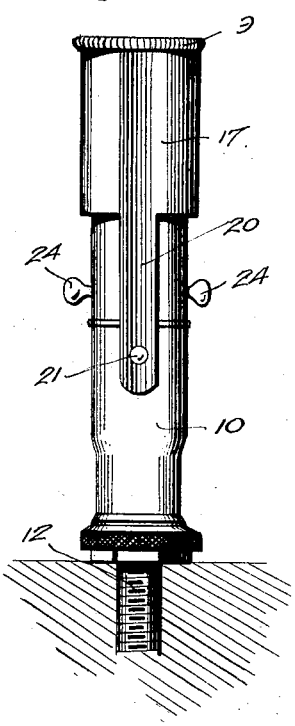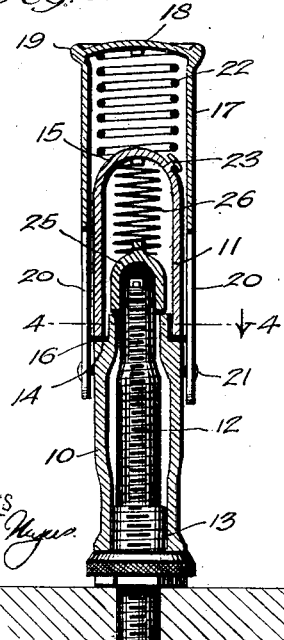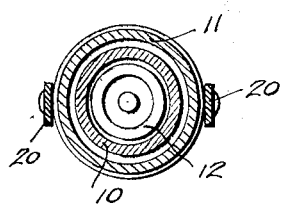

ALBERT KUFNER, OF SALEM, OREGON.

COMBINED DUST-CAP AND VALVE-CAP FOR PNEUMATIC TIRES.

1,372,963.  Specification of Letters Patent.  Patented Mar. 29, 1921.

Application filed March 8, 1920, Serial No. 364,002. Renewed January 26, 1921. Serial No. 440,221.

*To all whom it may concern:*

Be it known that I, ALBERT KUFNER, a citizen of the United States of America, residing at Salem, in the county of Marion and State of Oregon, have invented certain new and useful Improvements in Combined Dust-Caps and Valve-Caps for Pneumatic Tires, of which the following is a specification.

My present invention relates generally to valve caps and dust caps of automobile and other pneumatic tires which are ordinarily required to be independently removed by unscrewing respectively from the reduced threaded extremity and from the externally threaded body of the stem, and my object is the provision of a device by means of which the somewhat laborious unscrewing of both the dust cap and the valve cap may be dispensed with, my improved construction permitting the extremity of the valve stem to be exposed for inflating or inspection purposes with minimum effort and in a minimum length of time.

To this end my invention proposes a cylindrical dust cap in two parts, one of which parts threads on the valve stem to form a support and is engaged by means serving to normally hold the other part in dust proof connection therewith, and my invention also proposes a valve cap within the last mentioned part of the dust cap, as well as a support whereby it may under normal circumstances perform the usual functions of a valve cap and may at the same time be quickly and readily removed with that part of the dust cap forming its support.

In the accompanying drawing, illustrating a part of the invention and forming a part of this specification:

Figure 1, is a front elevation.

Fig. 2 is a side elevation.

Fig. 3 is a central vertical section.

Fig. 4 is a horizontal section taken on line 4—4 of Fig. 3.

Referring now to these figures, my improved dust cap which is tubular throughout, consists of two cylindrical sections 10 and 11, the inner section 10 of which is internally threaded to screw upon a pneumatic valve stem 12, as at 13, and has its outer end provided with a reduced annular extension which forms an annular gasket receiving shoulder 14. In the effective position of the two parts of the dust cap, the outer part 11, which is closed at its outer end 15, has its inner open end telescoping the reduced extension of the outer end of the inner part 10 and engaging a gasket 16 against the shoulder of the inner part or section 10 as previously mentioned.

The outer part or section 11 of the dust cap is carried within a tubular holder 17, the outer end 18 of which is closed and has a surrounding knurled bead 19 for the purpose of better gripping. The open end of this holder 17 has a pair of parallel extending and diametrically opposed arms 20, whose free ends are pivoted at 21 to the inner part 10 of the dust cap with respect to which the holder 17 is thus permitted to rock on its pivots.

Within the tubular holder 17 is a spring 22, one end of which is anchored at the closed end 18 of the holder and the opposite end of which is anchored upon a stud 23 of the closed end 15 of the outer section 11 of the dust cap, and this spring functions under normal circumstances to yieldingly hold the inner end of the outer section 11 in the effective position above stated, this outer section 11 having diametrically opposed knobs 24 forming handles by means of which it may be shifted lengthwise within the holder against the tension of spring 22 so that the holder may be shifted on its pivots when the section 11 is free of section 10.

Within the section 11 is a cup shaped valve cap 25 arranged to telescope the extremity of the valve stem 12 as seen in Fig. 3 and to support a gasket similar to the usual gasket in the ordinary screw cap. This cup shaped valve cap is securely engaged by one end of the spring 26, the opposite end of which spring is secured to the closed end 15 of the said section 11, so that when the handles 24 are grasped and the dust cap section 11 lifted from the section 10, the valve cap 25 will also be lifted from the extremity of the valve stem and the several parts may then be shifted angularly with respect to section 10, so as to expose the extremity of the valve stem for inflation or inspection purposes.

It is thus observed that my invention avoids the usual delays and labor to unscrew dust and valve caps, and proposes parts performing similar functions yet capable of practically instantaneous removal. In this way, I also avoid the danger of crossing the threads, always present in the screwing and unscrewing of threaded parts.

I claim:—

1. The combination with a pneumatic valve stem, of a tubular dust cap in two sections, having a sliding joint, one of which sections is threaded to screw upon the valve stem, a holder within which the other section is longitudinally movable, having a pivoted connection with the first section, a spring within the holder engaging the section of the dust cap carried thereby, and a spring controlled valve cap with the section of the dust cap carried by said holder arranged to telescope the extremity of the valve stem and having a gasket therein, as described.

2. The combination with a pneumatic valve stem, of a tubular dust cap in two sections, having a sliding joint, one of which sections is threaded to screw upon the valve stem, a holder within which the other section is longitudinally movable, having a pivoted connection with the first section, a spring within the holder engaging the section of the dust cap carried thereby and a spring controlled valve cap within the section of the dust cap carried by said holder arranged to telescope the extremity of the valve stem, and having a gasket therein, as described, said section of said dust cap threaded on the valve stem having a reduced outer end forming an annular shoulder and which the free end of the holder carried section telescopes and a gasket on the said shoulder engaged by the free end of the last mentioned section, as described.

3. The combination with a pneumatic valve stem, of a dust cap in two parts arranged to partially telescope and having abutting portions, a gasket interposed between said abutting portions, an internal spring controlled gasket supporting cap within one of said sections to telescope the free end of the valve stem, the other of the said sections having internal threads to engage the valve stem, a tubular holder within which the first mentioned section is longitudinally movable and a spring in the holder controlling its said section of the dust cap, the said last mentioned section of a dust cap being provided with handles and said holder having extensions pivoted on the other section of the dust cap threaded to the valve stem, as described.

4. The combination with a pneumatic valve stem, of a dust cap, including a valve stem carried section stationary on the valve stem, a second section having a longitudinally sliding connection with the first section, a spring controlled valve cap within the last mentioned section, having a sliding engagement with the extremity of the valve stem, a holder in which the movable section of the dust cap is lengthwise shiftable toward and away from the stationary section, having a pivoted connection with the stationary section on which the movable section is shiftable when disengaged from the stationary section, and a spring within said holder to normally shift the movable section toward the stationary section, as described.

In testimony whereof I affix my signature.

ALBERT KUFNER.